US010149133B2

(12) United States Patent
Scagnol et al.

(10) Patent No.: US 10,149,133 B2
(45) Date of Patent: Dec. 4, 2018

(54) FACILITATING A LOCATION DETERMINATION OF A USER EQUIPMENT THAT IS CONNECTED TO A MASTER RADIO BASED UPON SLAVE RADIO MEASUREMENTS

(71) Applicant: QUALCOMM Incorporated, San Diego, CA (US)

(72) Inventors: Mauro Scagnol, Cambridge (GB); Paul Hiscock, Cambridge (GB); Ian Blair, Cambridge (GB); Marko Velic, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/273,191

(22) Filed: Sep. 22, 2016

(65) Prior Publication Data

US 2018/0084371 A1   Mar. 22, 2018

(51) Int. Cl.
*H04W 4/06*  (2009.01)
*H04W 88/06*  (2009.01)
(Continued)

(52) U.S. Cl.
CPC .......... *H04W 4/80* (2018.02); *G01S 5/0205* (2013.01); *G01S 5/0221* (2013.01);
(Continued)

(58) Field of Classification Search
CPC . H04W 4/06; H04W 72/1215; H04W 74/002; H04W 84/045; H04W 28/08;
(Continued)

(56) References Cited

U.S. PATENT DOCUMENTS 7,653,397 B2 * 1/2010 Pernu ................ H04W 72/1215
455/450
7,778,603 B2 * 8/2010 Palin ..................... H04L 47/762
370/311

(Continued)

FOREIGN PATENT DOCUMENTS

| EP | 2942760 A1 | 11/2015 |
| GB | 2312801 A | 11/1997 |
| WO | 2007013850 A2 | 2/2007 |

OTHER PUBLICATIONS

Deak G., et al., "A Survey of Active and Passive Indoor Localisation Systems," Computer Communications, 2012, vol. 35, Retrieved dated on May 16, 2016, Retrieved from the Internet URL: https://www.researchgate.net/publication/232271910 , pp. 1939-1954.

(Continued)

*Primary Examiner* — William D Cumming
(74) *Attorney, Agent, or Firm* — Muncy, Geissler, Olds & Lowe, P.C.

(57) ABSTRACT

Embodiments relate to a deployment of a master radio in conjunction with one or more slave radios. The master radio coordinates with a UE, or transmitter, to transmit a particular known set of wireless signals in a defined time window over a dedicated wireless connection between the UE and the master radio. The master radio separately coordinates with the one or more slave radios to monitor for and measure the dedicated wireless connection during the defined time window (e.g., to obtain AoA measurements, signal strength measurements, etc.). The measurements can be reported to the master radio or a separate measurement processing unit to facilitate a location determination of the UE.

19 Claims, 14 Drawing Sheets

(51) Int. Cl.
| | |
|---|---|
| *H04W 28/08* | (2009.01) |
| *H04W 4/80* | (2018.01) |
| *G01S 5/02* | (2010.01) |
| *G07C 9/00* | (2006.01) |
| *H04W 4/029* | (2018.01) |
| *H04W 4/02* | (2018.01) |
| *H04B 17/318* | (2015.01) |
| *G01S 5/04* | (2006.01) |
| *H04B 17/27* | (2015.01) |

(52) U.S. Cl.
CPC ........ *G07C 9/00174* (2013.01); *H04W 4/029* (2018.02); *G01S 5/04* (2013.01); *G07C 2009/00769* (2013.01); *G07C 2209/63* (2013.01); *H04B 17/27* (2015.01); *H04B 17/318* (2015.01); *H04W 4/02* (2013.01)

(58) Field of Classification Search
CPC ... H04W 4/005; H04W 88/06; H04W 76/048; H04W 47/70
USPC ................ 455/41.2, 500, 552.1, 450, 456.54
See application file for complete search history.

(56) References Cited

U.S. PATENT DOCUMENTS

| | | | | |
|---|---|---|---|---|
| 8,103,213 | B2* | 1/2012 | Tolonen | H04B 1/3805 370/338 |
| 8,374,618 | B2* | 2/2013 | Pernu | H04W 72/1215 455/450 |
| 8,521,096 | B2* | 8/2013 | Pernu | H04W 88/06 370/310 |
| 8,626,144 | B2 | 1/2014 | Talty et al. | |
| 8,717,974 | B2* | 5/2014 | Rofougaran | H04W 84/045 370/310 |
| 9,008,917 | B2 | 4/2015 | Gautama et al. | |
| 9,615,395 | B2* | 4/2017 | Yu | H04L 5/0032 |
| 2001/0021654 | A1* | 9/2001 | Spratt | G01S 5/0072 455/500 |
| 2001/0026552 | A1* | 10/2001 | Spratt | H04W 4/06 370/390 |
| 2001/0044311 | A1* | 11/2001 | Larsson | G01S 5/06 455/456.5 |
| 2008/0192721 | A1* | 8/2008 | Pernu | H04W 72/1215 370/345 |
| 2010/0056200 | A1* | 3/2010 | Tolonen | H04B 1/3805 455/552.1 |
| 2010/0085951 | A1* | 4/2010 | Pernu | H04W 72/1215 370/338 |
| 2010/0260136 | A1* | 10/2010 | Fan | H04W 72/0453 370/330 |
| 2010/0309310 | A1* | 12/2010 | Albright | G08G 5/0082 348/135 |
| 2011/0021146 | A1* | 1/2011 | Pernu | H04W 88/06 455/41.2 |
| 2014/0240091 | A1 | 8/2014 | Talty et al. | |
| 2015/0373584 | A1* | 12/2015 | Hong | H04W 28/08 370/329 |
| 2016/0044443 | A1 | 2/2016 | Azizi et al. | |
| 2017/0085572 | A1* | 3/2017 | Miyakawa | H04L 63/08 |
| 2017/0171690 | A1* | 6/2017 | Kim | H04W 4/00 |
| 2017/0180912 | A1* | 6/2017 | Shiro | H04W 4/70 |
| 2018/0084371 | A1* | 3/2018 | Scagnol | G01S 5/0205 |

OTHER PUBLICATIONS

International Search Report and Written Opinion—PCT/US2017/048118—ISA/EPO—dated Dec. 8, 2017.

\* cited by examiner

FACILITATING A LOCATION DETERMINATION OF A USER EQUIPMENT THAT IS CONNECTED TO A MASTER RADIO BASED UPON SLAVE RADIO MEASUREMENTS

BACKGROUND

1. Field of the Disclosure

Embodiments relate to facilitating a location determination of a user equipment (UE) that is connected to a master radio based upon slave radio measurements.

2. Description of the Related Art

The location of a device can affect a number of operations. For example, in a Passive-Entry/Passive-Start (PEPS) implementation, detection of a keyfob or a user's phone may trigger different actions based on whether the keyfob (or phone) is determined to be inside or outside of the vehicle (e.g., unlock the vehicle if the keyfob is outside the vehicle and start the vehicle if the keyfob is inside the vehicle). For example, one location-positioning technique relies upon signal strengths (or Received Signal Strength Indications (RSSIs)) of radio frequency (RF) transmissions (e.g., Bluetooth, etc.) measured at one or more antennas deployed in the vehicle.

Another location-positioning technology developed by Bluetooth Special Interest Group (SIG) relates to a connection-based Angle of Arrival (AoA) technique where tones are appended to packets transmitted by a slave transmitter (e.g., the keyfob, the user's phone, etc.) in a dedicated Bluetooth connection to a master radio that processes the signals through an antenna array. In a PEPS embodiment of this technique, the master radio may control an antenna array deployed in the vehicle or, to improve the target location estimate, aggregate the results of a group of antenna arrays deployed throughout the vehicle. The master radio may require coupling to each antenna array via a physical connection (e.g., a coaxial cable) that must be installed and calibrated by the vehicle manufacturer, which adds to the manufacturing complexity of the vehicle as well as the materials cost.

SUMMARY

An embodiment of the disclosure is directed to a method of operating a master radio, including establishing a dedicated wireless connection between the master radio and a user equipment (UE), transmitting a request for the UE to transmit a set of wireless signals over the dedicated wireless connection in a defined time window and instructing one or more slave radios coupled to the master radio to monitor the dedicated wireless connection during the defined time window to facilitate a location determination of the UE based on a collection of one or more measurements of the dedicated wireless connection during the defined time window by each of the one or more slave radios.

Another embodiment of the disclosure is directed to a method of operating a slave radio coupled to a master radio, including receiving an instruction from the master radio to monitor a dedicated wireless connection established between the master radio and a UE during a defined time window, monitoring the dedicated wireless connection during the defined time window in response to the instruction, performing one or more measurements on the dedicated wireless connection during the defined time window based on the monitoring and reporting the one or more measurements to facilitate a location determination of the UE.

Another embodiment of the disclosure is directed to master radio, including a communications interface configured to establish a dedicated wireless connection between the master radio and a UE, transmit a request for the UE to transmit a set of wireless signals over the dedicated wireless connection in a defined time window, and instruct one or more slave radios coupled to the master radio to monitor the dedicated wireless connection during the defined time window to facilitate a location determination of the UE based on a collection of one or more measurements of the dedicated wireless connection during the defined time window by each of the one or more slave radios.

Another embodiment of the disclosure is directed to slave radio coupled to a master radio, including a communications interface configured to receive an instruction from the master radio to monitor a dedicated wireless connection established between the master radio and a user equipment (UE) during a defined time window, and a processor coupled to one or more receive antenna arrays and configured to monitor the dedicated wireless connection during the defined time window in response to the instruction, and to perform one or more measurements on the dedicated wireless connection during the defined time window based on the monitoring, wherein the communications interface is further configured to report the one or more measurements to facilitate a location determination of the UE.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
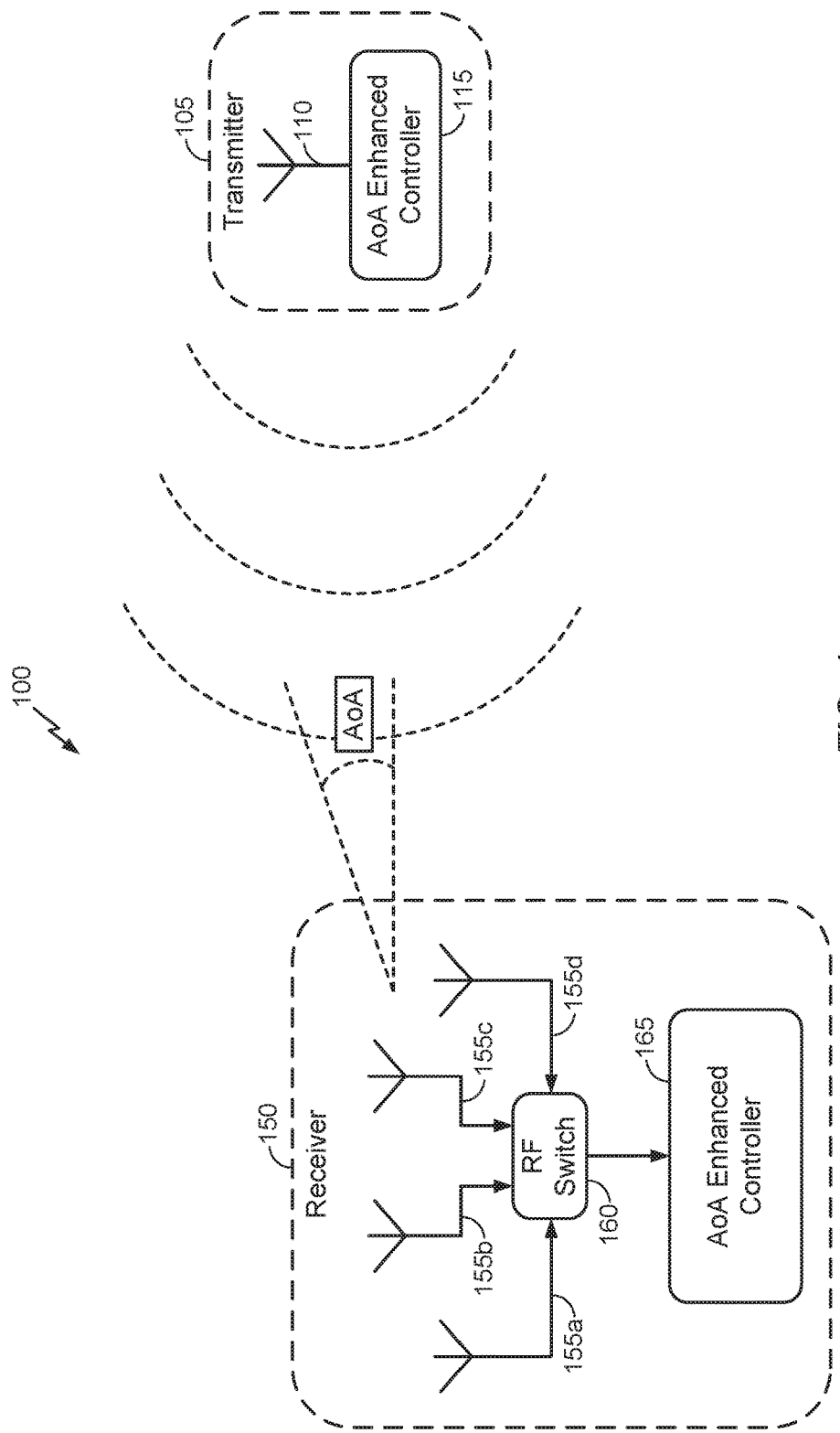
FIG. 1 illustrates an Angle of Arrival (AoA) detection system in accordance with an embodiment of the disclosure.

FIG. 1 illustrates an Angle of Arrival (AoA) detection system 100 in accordance with an embodiment of the disclosure. The AoA detection system 100 includes a transmitter 105 and a receiver 150. The transmitter 105 includes an antenna 110 and an AoA enhanced controller 115. The receiver 150 includes a receive antenna array deployment including receive antenna arrays 155a, 155b, 155c and 155d (e.g., whereby each receive antenna array includes two or more antenna elements), a radio frequency (RF) switch 160 and an AoA enhanced controller 165. While the embodiment of FIG. 1 depicts four receive antenna arrays (155a, 155b, 155c and 155d), it will be appreciated that receivers in AoA detection systems in accordance with other embodiments of the disclosure may include any number of receive antenna arrays (e.g., three, five, ten, etc.). The transmitter 105 is directed to transmit signals by the AoA enhanced controller 115, and these signals are received by the receive antenna arrays 155a-155d and measured by the AoA enhanced controller 165 at the receiver 150 which determines AoAs associated with the received signals. The AoA enhanced controller 165 may alternatively be referred to as a radio. In various embodiments disclosed below, some examples of AoA enhanced controllers like AoA enhanced controller 115 and AoA enhanced controller 165, are described as a master radio or as a slave radio, as applicable in each embodiment. In some embodiments, as described further below with specific reference to FIGS. 5 and 7, and elsewhere throughout this specification, where there are a plurality of controllers similar to AoA enhanced controller 165, one may be a master radio with one or more serving as slave radios.

Figure 2:
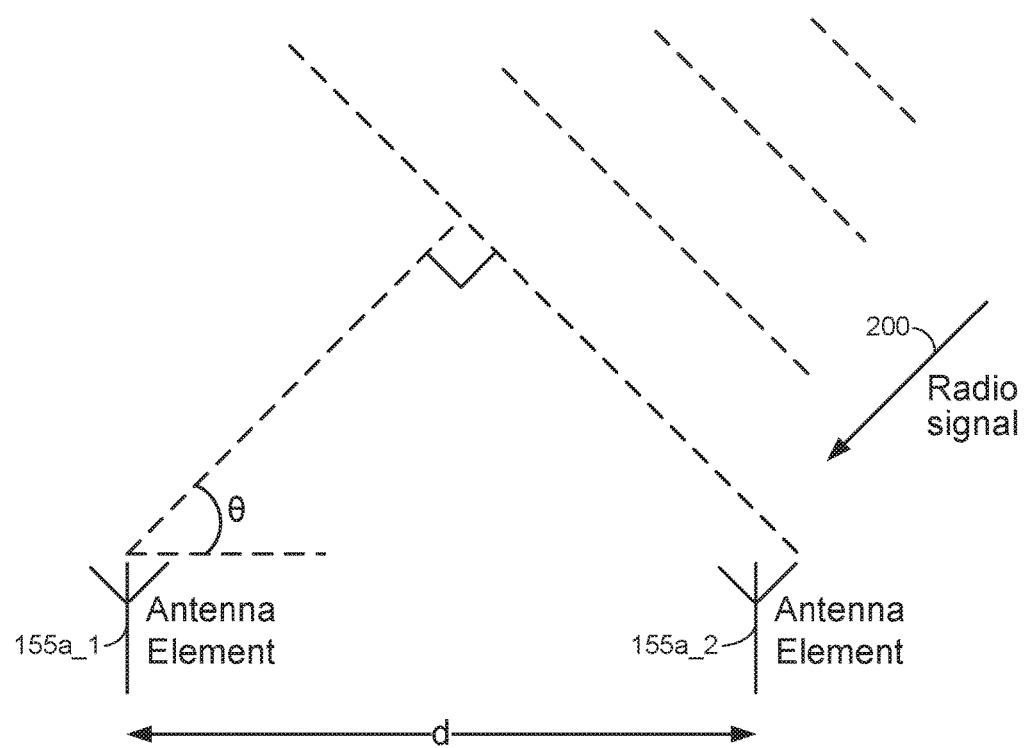
FIG. 2 depicts a radio signal arriving at antenna elements of an antenna array at a receiver in accordance with an embodiment of the disclosure.

Referring to FIG. 1 in context with a Bluetooth-specific implementation, in an example, the transmitter 105 transmits a known set of AoA signals (e.g., a tone with all 1's implying a 250 kHz offset), and the receiver 150 receives the set of AoA signals via the multiple switched antenna arrays 155a-155d to determine a phase shift associated with each switch event at the AoA enhanced controller 165. The AoA enhanced controller calibrates (or filters out) antenna and switch variations to determine the relative phase of the known signal as received at each of the antenna arrays 155a-155d. The relative phases of the known signal as received at each of the antenna arrays 155a-155d can then be used by the AoA enhanced controller 165 to determine the AoA (e.g., azimuth and elevation, if the antenna geometry is appropriate). FIG. 2 depicts a radio signal 200 arriving at antenna elements 155a_1 and 155a_2 of the antenna array 155a at the receiver 150 of FIG. 1 in accordance with an embodiment of the disclosure. In FIG. 2, the AoA of the radio signal 200 can be calculated as follows:

$$\theta = \cos^{-1}(\psi \lambda / 2\pi d) \qquad \text{Equation 1}$$

whereby $\theta$ denotes the AoA for the radio signal 200, $\psi$ denotes the relative phase difference between two antenna elements (e.g., antenna elements 155a_1 and 155a_2) in the array (e.g., two antenna elements within antenna array 155a or antenna array 155b), d denotes the distance between the two antenna elements in the array and $\lambda$ denotes the wavelength. A device, for example a master radio, a slave radio (as described further below), or a processor in communication with either or both, can, using Equation 1, calculate an AoA value using raw or complex signal samples which may be used to compute the relative phase difference w. Hence, measurements sent by a slave radio to the master radio or another device can include the raw or complex signal samples by which the master radio or the other device can calculate an AoA value in accordance with Equation 1 above.

Figure 3:
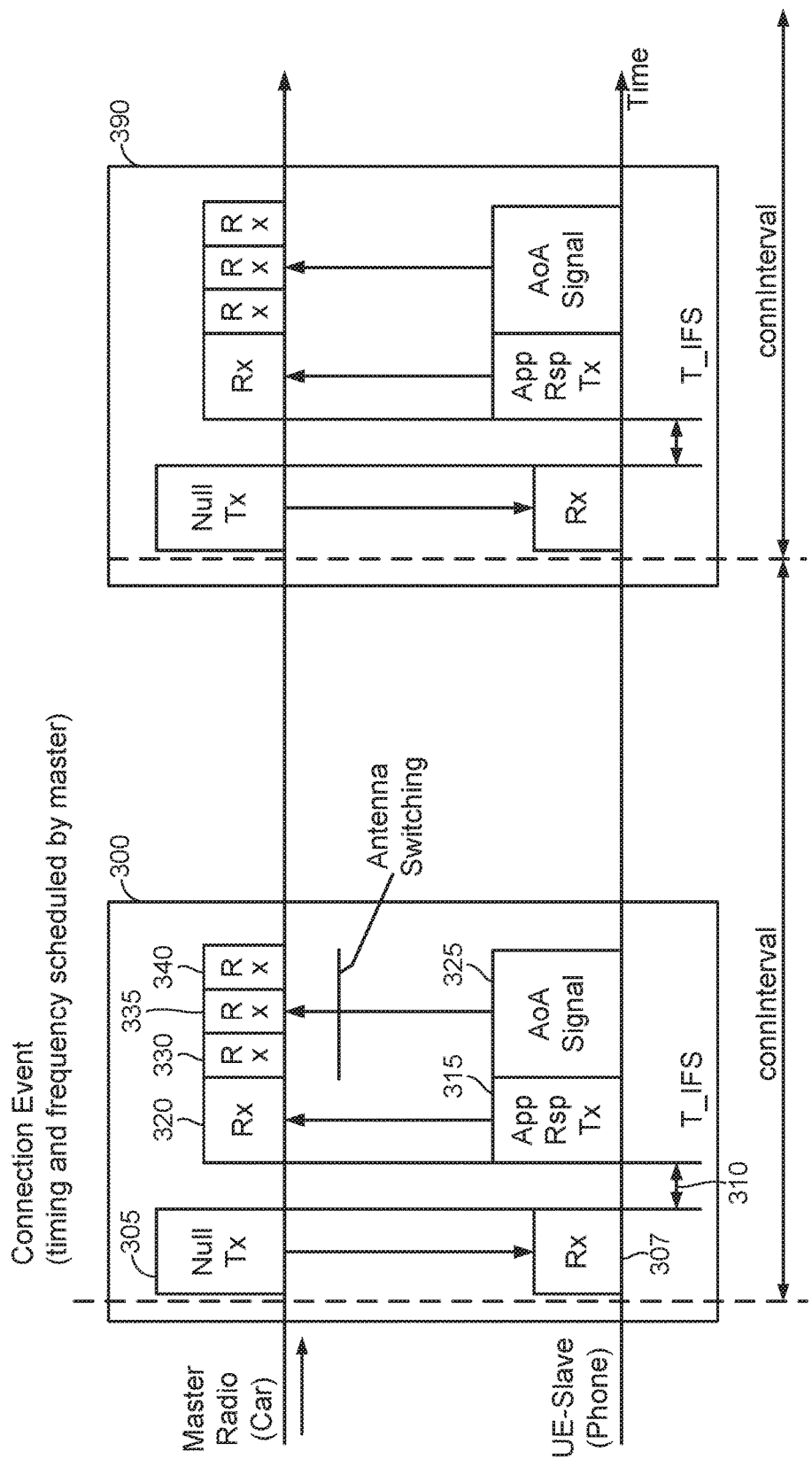
FIG. 3 illustrates an example of the signals exchanged between a transmitter 105 and a receiver in accordance with an embodiment of the disclosure.

FIG. 3 illustrates an example of the signals exchanged between the transmitter 105 and the receiver 150 of FIG. 1 in accordance with an embodiment of the disclosure. The signaling depicted in FIG. 3 can be coordinated between the AoA enhanced controller 115 at the transmitter 105 and the AoA enhanced controller 165 at the receiver 150.

Referring to FIG. 3, signals to be used for AoA measurements are transmitted by the UE-slave (e.g., a phone, keyfob, etc.) and received by the master radio within connection events 300 and 390 that repeat at a given Connection Interval (or connInterval). The connection event 300 begins with a null transmission period 305-307 to facilitate time calibration between the master radio and the UE-slave, followed by the UE-slave waiting a transmission inter-frame space (T_IFS) 310, and then performing an initial packet transmission 315 (e.g., denoted as AppRspTx) which is received by the master radio at 320. In an example, the null transmission period 305-307 has a known length so that the UE-slave knows how long to wait before monitoring the set of AoA signals. So, the null transmission period 305-307 is one example implementation, but this period could alternatively include transmissions in other embodiments so long as the duration of the period is known.

The initial packet transmission 315 appended with a transmission of the set of AoA signals (e.g., all is implying a 250 kHz offset, etc.) at 325. While the UE-slave is transmitting the set of AoA signals, the master radio switches between its antenna elements in the array (e.g., array 155*a*) so that each antenna element in the array can measure the set of AoA signals, as shown in 330, 335 and 340 for three exemplary antenna elements (although there can be more or fewer antenna elements than three in other embodiments). A similar signal exchange sequence may occur for the next connection event 390, which is not described further for the sake of brevity: in that connection event the master can use the same or a different group of antenna arrays. Collecting the AoA measurements via repetitive connIntervals allows the master radio to track the location of the UE-slave over time.

Figure 4:
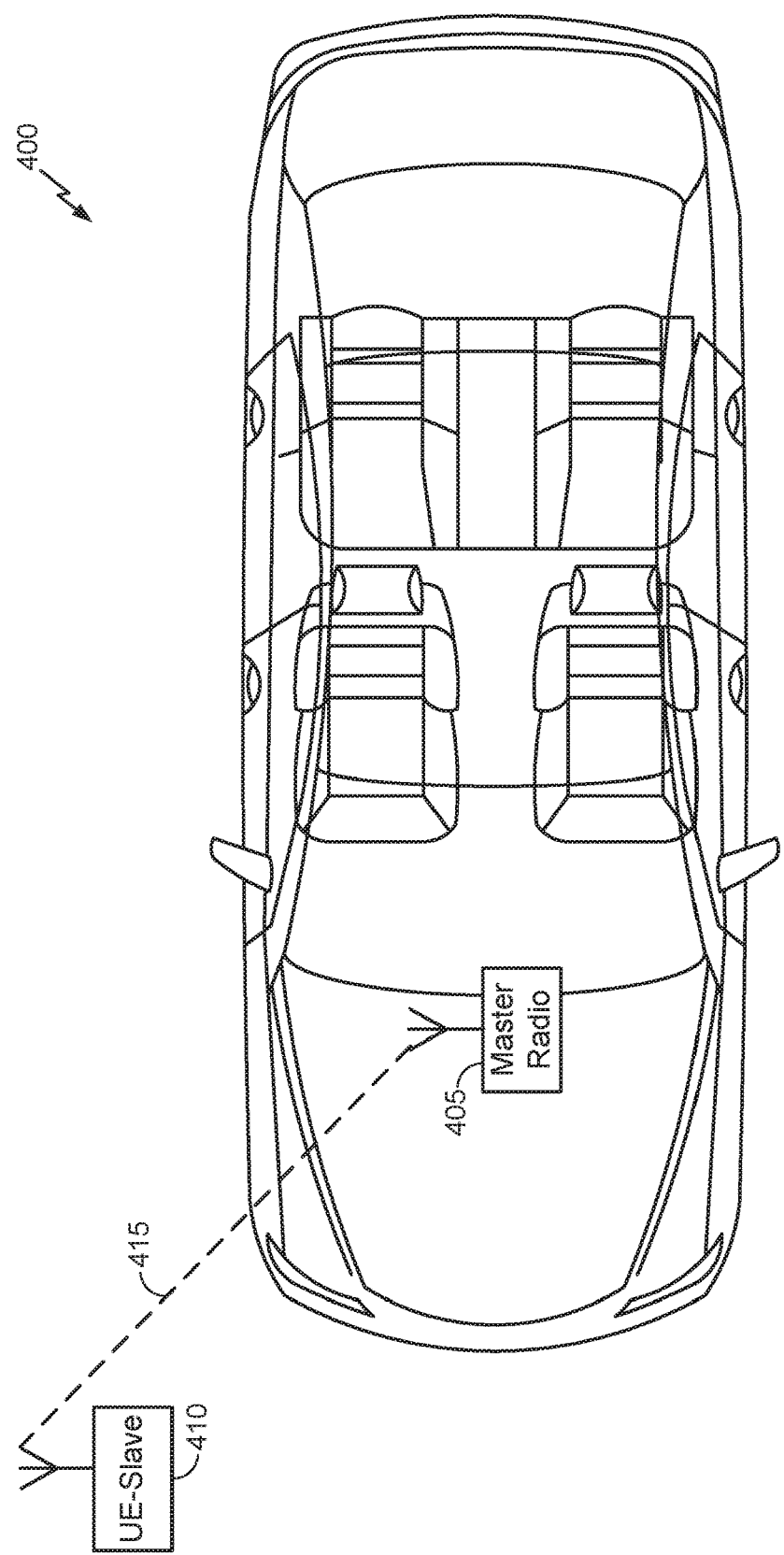
FIG. 4 illustrates a vehicle whereby a master radio is coupled to a user equipment (UE)-slave via a dedicated wireless connection.
Figure 5:
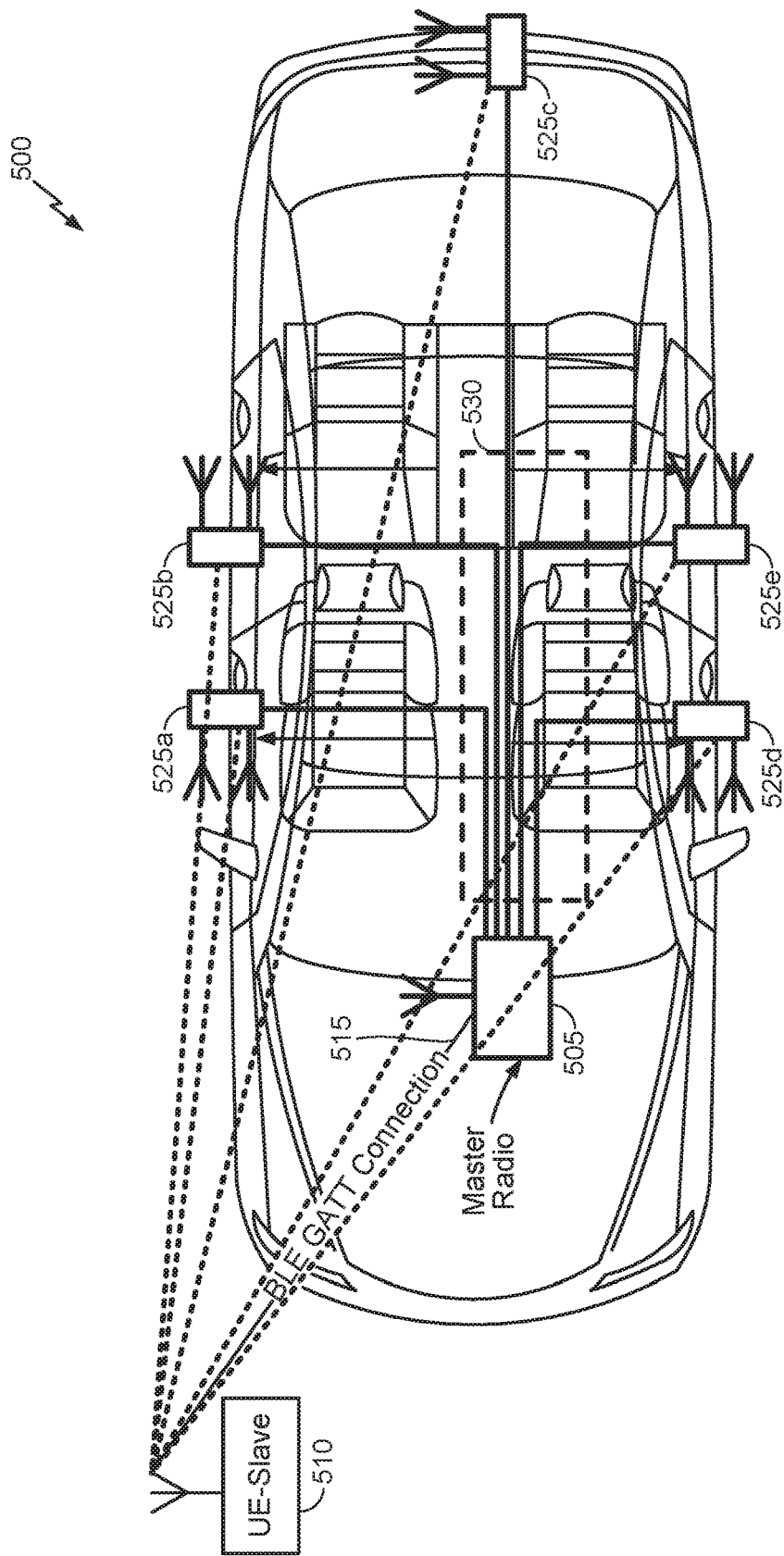
FIG. 5 illustrates a Bluetooth-specific implementation of FIG. 4 in more detail, whereby a vehicle includes a master radio coupled to a UE-slave via a Bluetooth Generic Attribute Profile (GATT) connection.

In FIG. 3, the receiver 150 may correspond to the master radio of a vehicle, and the transmitter 105 may correspond to the UE-slave (e.g., a keyfob or phone), as in the examples depicted in FIGS. 4-5. FIG. 4 illustrates a vehicle 400 whereby a master radio 405 is coupled to a UE-slave 410 via a dedicated wireless connection 415 (e.g., a Bluetooth, WiFi, near-field communication (NFC) or Institute for Electrical and Electronics Engineers (IEEE) 802.15.4 (including ZigBee, MiWi, or other implementations of IEEE 802.15.4) connection, etc.). FIG. 5 illustrates a Bluetooth-specific implementation of FIG. 4 in more detail, whereby a vehicle 500 includes a master radio 505 coupled to a UE-slave 510 (e.g., a slave device relative to the master radio 505) via a Bluetooth Generic Attribute Profile (GATT) connection 515. The master radio 505 is shown in FIG. 5 as coupled to multiple antenna arrays 525*a*, 525*b*, 525*c*, 525*d* and 525*e* via a number of physical cables 530 (e.g., CANBUS). The physical cables 530 may be installed and calibrated by a manufacturer of the vehicle 500, which may add to the manufacturing complexity of the vehicle 500 as well as the materials cost. Alternatively, each antenna array is connected to a local slave radio, which performs a measurement. The physical cables 530 in this example could be a CANBUS, which is used to return the partial AoA results to a central processor associated with the master radio 505. In this alternative example, coordination between the master radio 505 and the antenna arrays 525*a*, 525*b*, 525*c*, 525*d* and 525*e* may occur over the CANBUS itself (which is also used to relay the partial AoA results back to the central processor associated with the master radio 505) or via separate wireless connection(s) as will be described in more detail below with respect to FIG. 7.

Embodiments of the disclosure relate to a deployment of a master radio in conjunction with one or more slave radios. The master radio coordinates with a user equipment (UE), which may alternatively be referred to as a UE-slave or transmitter, to transmit a particular known set of AoA signals in a defined time window over a dedicated wireless connection between the UE and the master radio. The master radio separately coordinates with the one or more slave radios to monitor for and measure the dedicated wireless connection during the defined time window (e.g., to obtain AoA measurements, signal strength measurements, channel strength measurements, etc.). The measurements can be reported to the master radio or a separate measurement processing unit to facilitate a location determination of the UE.

Figure 6:
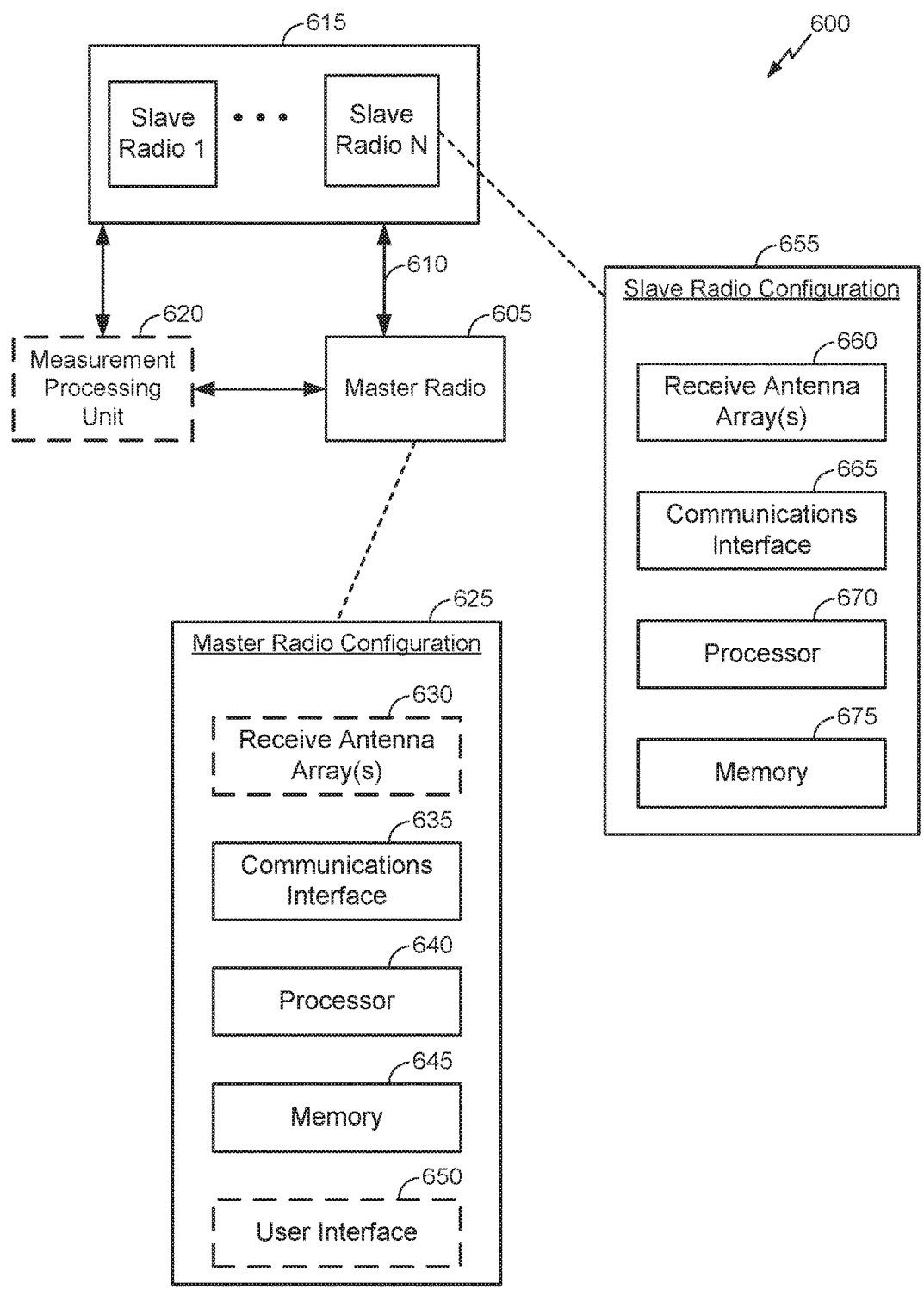
FIG. 6 illustrates a radio arrangement in accordance with an embodiment of the disclosure.

FIG. 6 illustrates a radio arrangement 600 in accordance with an embodiment of the disclosure. Referring to FIG. 6, the radio arrangement 600 includes a master radio 605 that is coupled, via one or more connections 610, to a slave radio deployment 615 that includes slave radios 1 . . . N (e.g., where N is an integer greater than or equal to 1). In an example, the one or more connections 610 may correspond to a single (broadcast) connection by which the master radio 605 can send data to each of the slave radios 1 . . . N concurrently. Alternatively, the one or more connections 610 may include N dedicated or 1:1 connections to the slave radios 1 . . . N. In an example, the connection 610 may correspond to a wired short-range connection (e.g., the coaxial cables illustrated in FIG. 5, although this type of implementation will add to the cost of the radio arrangement 600) or a set of one or more wireless short-range connections (e.g., Bluetooth, WiFi, ZigBee, near-field communication (NFC), IEEE 802.15.4, etc.). The master radio 605 and/or the slave radio deployment 615 may optionally be coupled to a measurement processing unit 620. In an example, the measurement processing unit 620 is optional because the functionality of the measurement processing unit 620 to process signal measurements so as to compute a location of a UE may alternatively be integrated into the master radio 605, in which case a separate or external measurement processing unit 620 may be omitted. In an example, the optional couplings between the master radio 605 and/or the slave radio deployment 615 and the measurement processing unit 620 may be implemented as wired or wireless short-range connections, similar to the connection 610. In a further example, in implementations whereby the radio arrangement 600 is deployed within a vehicle, the slave radios 1 . . . N can alternatively be referred to as vehicle-slaves, which is in contrast to the UE-slave referred to above with respect to FIGS. 3-5 which relates to an external slave device that would not be part of the radio arrangement 600.

Referring to FIG. 6, an example configuration 625 of the master radio 605 is depicted. The configuration 625 includes one or more optional receive antenna array(s) 630, a communications interface 635 (e.g., a Bluetooth connection or Controller Area Network bus (CANBUS) connection for supporting the connection 610 and/or for supporting a connection to the optional measurement processing unit 620, etc., an external wireless connection to a UE, etc.), a processor 640, a memory 645 and an optional user interface 650 (e.g., a vehicle dashboard, various knobs or buttons on a vehicle control interface, etc.). The receive antenna array(s) 630 are optional because, in at least one embodiment, the master radio 605 may be reliant upon the slave radios 1 . . . N for performing signal measurements. The user interface 650 is optional because, in at least one embodiment, any user interface components may be implemented separate from the master radio 605. In an example, the memory 645 may be implemented as a non-transitory computer-readable medium containing instructions stored thereon which, when executed by the master radio 605, cause the master radio 605 to perform actions, including but not limited to the actions described below with respect to FIGS. 9-13.

Referring to FIG. 6, an example configuration 655 of one of the slave radios 1 . . . N is depicted. The configuration 655 includes one or more receive antenna array(s) 660, a communications interface 665 (e.g., a Bluetooth connection or CANBUS connection for supporting the connection 610 and/or for supporting a connection to the optional measurement processing unit 620, etc.), a processor 670 and a memory 675. As will be explained further below with reference to FIGS. 11 and 12, the slave radios 615 may measure and report signal measurements to either the master radio 605 or the measurement processing unit 620. Hence, in some embodiments, the communications interface 665 can report the one or more measurements to the master radio 605, or to the measurement processing unit 620 that is separate from the master radio 605. In an example, the arrangement depicted in FIG. 5 where physical cables 530 (e.g., CANBUS) are used may rely upon receive antenna arrays being directly coupled to the master radio 505, where calibration can be used (e.g., to account for different cable lengths, etc.) and whereby the receive antenna arrays do not use their own radios (similar to the receiver 150 in FIG. 1 whereby the RF switch 160 switches between different receive antenna arrays). By contrast, the slave radios 1 . . . N may further include the additional components depicted in the configuration 655 to facilitate more sophisticated and independent operation, such as performing and reporting measurements and coordinating with various external components such as the master radio 605. In an example, the memory 675 may be implemented as a non-transitory computer-readable medium containing instructions stored thereon which, when executed by one or more of the slave radios 615, cause the respective slave radio(s) 615 to perform actions, including but not limited to the actions described below with respect to FIGS. 9-13.

Figure 7:
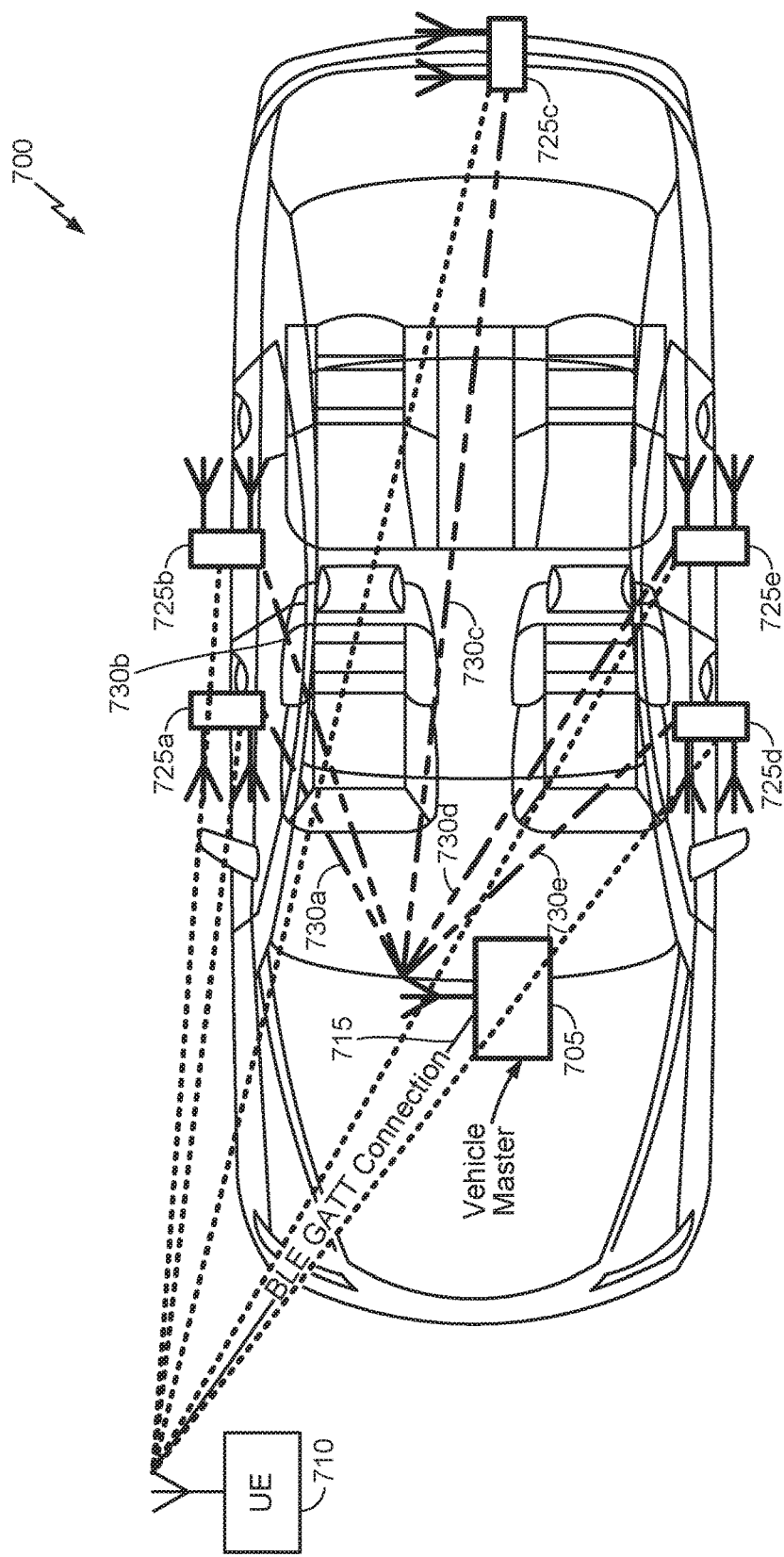
FIG. 7 illustrates a Bluetooth-specific implementation of the radio arrangement of FIG. 6 within a vehicle in accordance with an embodiment of the disclosure.

As noted above with respect to FIG. 6, it is possible that the connection 610 between the master 605 and the slave radios 1 . . . N corresponds to a physical or wired coupling (e.g., coaxial cables) similar to the physical cables 530 in FIG. 5 (although this implementation may rely upon a slave radio deployment in contrast to a receive antenna array deployment without slave radios). However, an alternative implementation is for the connection 610 to correspond to one or more short-range wireless connections (e.g., Bluetooth, WiFi, ZigBee, near-field communication (NFC), IEEE 802.15.4, etc.), as illustrated in FIG. 7 with respect to a Bluetooth-specific implementation in a vehicle 700 in accordance with an embodiment of the disclosure. Referring to FIG. 7, a master radio 705 is coupled to a UE 710 via a Bluetooth GATT connection 715. In contrast to FIG. 5, the master radio 705 is coupled to slave radios 725a, 725b, 725c, 725d and 725e via short-range wireless connections 730a, 730b, 730c, 730d and 730e instead of the physical cables 530 (e.g., coaxial cables) as depicted in FIG. 5.

Reference above is made to using the various slave radio deployments to identify a location of a transmitter. In embodiments of the disclosure, the transmitter corresponds to a UE (e.g., UE 510 of FIG. 5, UE 710 of FIG. 7, etc.), which may also be referred to interchangeably as a "UE-slave", an "access terminal" or "AT", a "wireless device", a "subscriber device", a "subscriber terminal", a "subscriber station", a "user terminal" or UT, a "mobile device", a "mobile terminal", a "mobile station", a keyfob and variations thereof. In some embodiments, UEs can communicate with a core network via a radio access network (RAN), and through the core network the UEs can be connected with external networks such as the Internet. Of course, other mechanisms of connecting to the core network and/or the Internet are also possible for the UEs, such as over wired access networks, Wi-Fi networks (e.g., based on IEEE 802.11, etc.) and so on. UEs can be embodied by any of a number of types of devices including but not limited to cellular telephones, smart phones, personal digital assistants (PDAs), pagers, laptop computers, desktop computers, printed circuit (PC) board cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel. Other types of UEs may only be configured for local wireless connectivity (e.g., Bluetooth, etc.), such that UEs need not have the above-noted functionality to be connected to the RAN and/or the Internet.

Further, the UE referenced in context with FIGS. 7-14 corresponds the UE-slave described above with respect to FIGS. 3-5. However, in context with FIGS. 7-14, reference is made to UE instead of UE-slave to avoid confusion with the other slave radios that are part of the same radio arrangement as the master radio and are used to measure the transmissions of the UE (or UE-slave).

Figure 8:
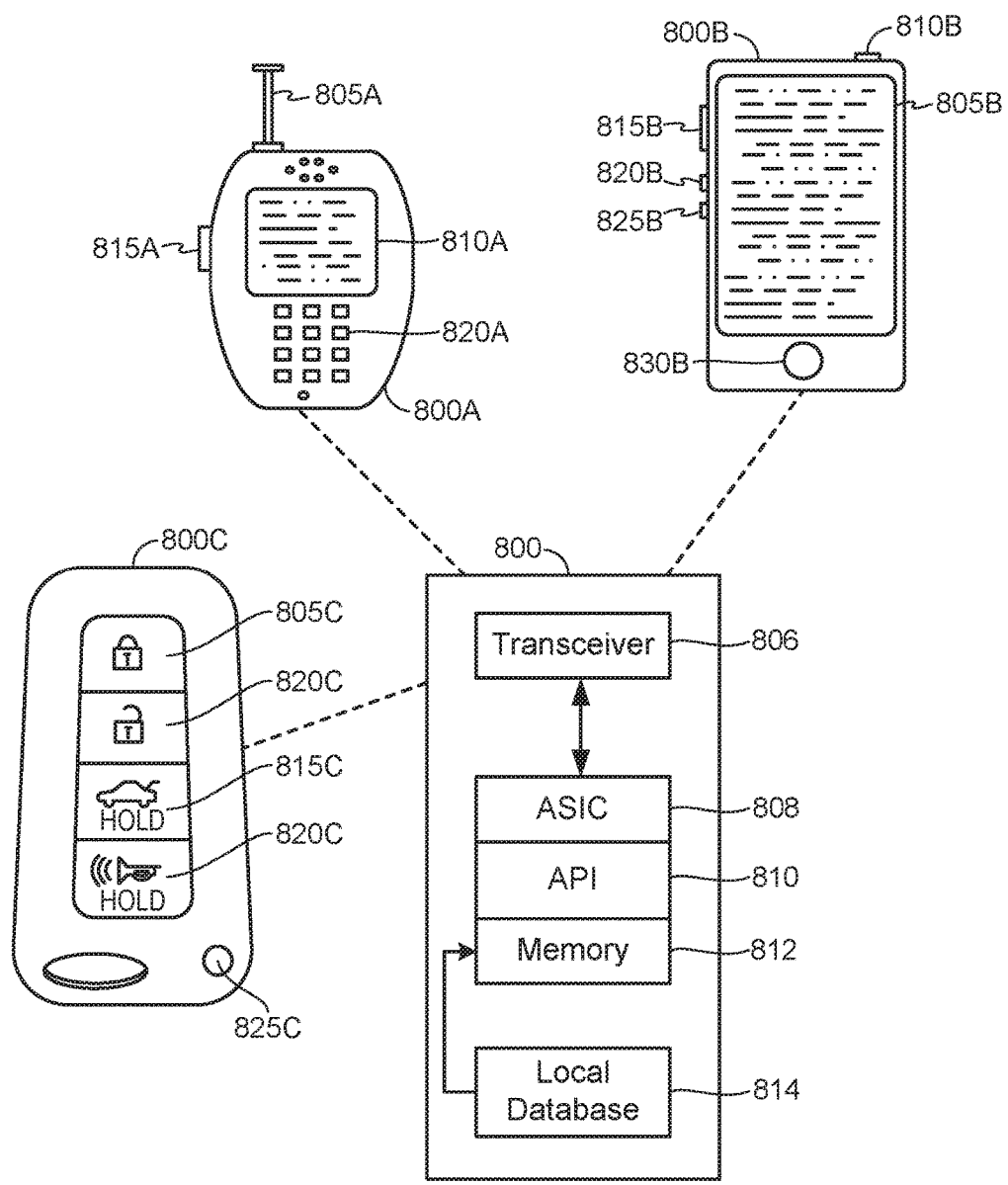
FIG. 8 illustrates a UE in accordance with embodiments of the disclosure.

FIG. 8 illustrates a UE 800 in accordance with embodiments of the disclosure. Different variants of UE 800 are depicted in FIG. 8 with respect to UEs 800A-800C. In particular, UE 800A is a calling telephone, UE 800B is a touchscreen device (e.g., a smart phone, a tablet computer, etc.) and UE 800C is a keyfob. The UE 800 of FIG. 8 may correspond to any of the UEs described below with respect to FIGS. 9-13.

While internal components of UE 800 can be embodied with different hardware configurations, a basic high-level UE configuration for internal hardware components may include a transceiver 806 operably coupled to an application specific integrated circuit (ASIC) 808, or other processor, microprocessor, logic circuit, or other data processing device. In an example, the transceiver 806 can be configured to establish a dedicated wireless connection with the master radio 605, as will be described in more detail below with respect to 900 of FIG. 9, 1100 of FIG. 11, 1200 of FIG. 12 and 1300-1320 of FIG. 13. In a further example, the transceiver 806 can also be configured to send a set of signals (e.g., AoA signals), as will be described in more detail below with respect 1115 of FIG. 11, 1215 of FIG. 12 and 1355 of FIG. 13. The ASIC 808 or other processor executes an application programming interface (API) 810 layer that interfaces with any resident programs in a memory 812 of the wireless device. The memory 812 can be comprised of read-only memory (ROM) or random-access memory (RAM), EEPROM, flash cards, or any memory common to computer platforms. UE 800 may also include a local database 814 that can store applications not actively used in the memory 812, as well as other data. The local database 814 is typically a flash memory cell, but can be any secondary storage device as known in the art, such as magnetic media, EEPROM, optical media, tape, soft or hard disk, or the like. In an example, the memory 812 and/or the local database 614 may be implemented as a non-transitory computer-readable medium containing instructions stored thereon which, when executed by the UE 800, cause the UE 800 to perform actions, including but not limited to the actions described below with respect to FIGS. 9-13.

Accordingly, an embodiment of the disclosure can include a UE with the ability to perform the functions described herein. As will be appreciated by those skilled in the art, the various logic elements can be embodied in discrete elements, software modules executed on a processor or any combination of software and hardware to achieve the functionality disclosed herein. For example, the ASIC 808, the memory 812, the API 810 and the local database 814 may all be used cooperatively to load, store and execute the various functions disclosed herein and thus the logic to perform these functions may be distributed over various elements. Alternatively, the functionality could be incorporated into one discrete component.

Referring to FIG. 8, UE 800A is configured with an antenna 805A, a display 810A, at least one button 815A (e.g., a push-to-talk (PTT) button, a power button, a volume control button, etc.) and a keypad 820A among other components, as is known in the art. Also, an external casing of UE 800B is configured with a touchscreen display 805B, peripheral buttons 810B, 815B, 820B and 825B (e.g., a power control button, a volume or vibrate control button, an airplane mode toggle button, etc.), and at least one front-panel button 830B (e.g., a Home button, etc.), among other components, as is known in the art. UE 800C is configured with a lock button 805C, an unlock button 810C, a trunk release button 815C, a panic button 820C and a key release button 825C. While not shown explicitly as part of UE 800B, UE 800B and UE 800C can include one or more external antennas and/or one or more integrated antennas that are built into their respective casings, including but not limited to Wi-Fi antennas, cellular antennas, satellite position system (SPS) antennas (e.g., global positioning system (GPS) antennas), local RF antennas (e.g., Bluetooth, etc.), and so on.

With respect to FIG. 8, it will be appreciated that the various UE types represented by UEs 800A-800C can be implemented in various embodiments of the disclosure in different ways. For example, if the UE is implemented as a keyfob 800C, the keyfob 800C may be used to open and/or lock a vehicle (e.g., vehicle 700 of FIG. 7) as well as communicate with a master radio (e.g., master radio 705) and transmit a set of signals (e.g., AoA signals) for monitoring by one or more slave radios (e.g., slave radios 725a . . . 725e of FIG. 7). In another example, if the UE is implemented as a calling telephone 800A, or touchscreen device 800B (e.g., a smart phone), the calling telephone 800A or touchscreen device 800B may download an application that, upon execution, permits interaction with a master radio (e.g., master radio 605 of FIG. 6, master radio 705 of FIG. 7, etc.) in a vehicle (e.g., vehicle 700 of FIG. 7) so that a location of the calling telephone 800A or touchscreen device 800C relative to the vehicle 700 can be ascertained.

Figure 9:
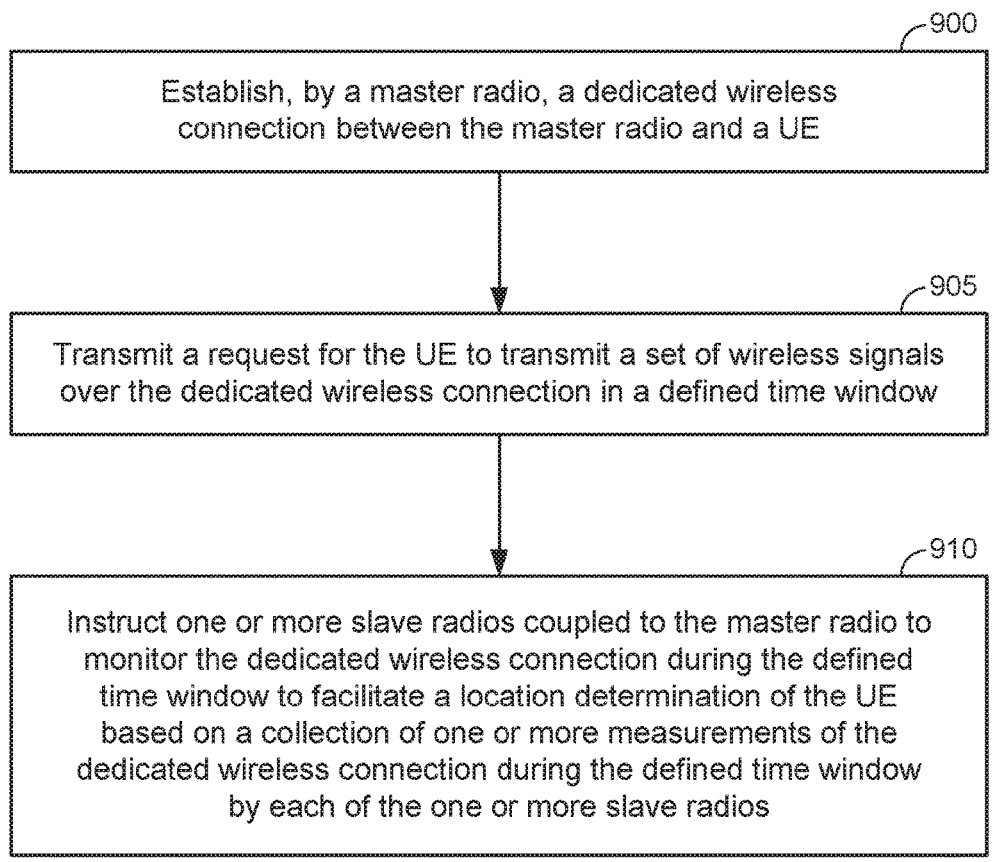
FIG. 9 illustrates a process of coordinating measurements by one or more slave radios of signals transmitted by a UE within a defined time window in accordance with an embodiment of the disclosure.

FIG. 9 illustrates a process of coordinating measurements by one or more slave radios of signals transmitted by a UE within a defined time window in accordance with an embodiment of the disclosure. The process of FIG. 9 may be implemented by a master radio, such as the master radio 605 of FIG. 6 or the master radio 705 of FIG. 7.

Referring to FIG. 9, the master radio establishes a dedicated wireless connection between the master radio and the UE, as shown in block 900. For example, the dedicated wireless connection may correspond to one of a Bluetooth connection (e.g., a Bluetooth GATT connection), a WiFi (IEEE 802.11) connection, an NFC connection, an IEEE 802.15.4 or low-rate wireless personal area network (LR-WPAN) connection, for example, ZigBee, etc.), as described above. The master radio transmits a request for the UE to transmit a set of AoA signals (e.g., such as the set of AoA signals 325 described above with respect to FIG. 3, which may be all 1s in an example) over the dedicated wireless connection in a defined time window, as shown in block 905. In an example, the defined time window may correspond to the portion of the connection event in FIG. 3 where the set of AoA signals 325 is transmitted.

Referring to FIG. 9, the master radio further instructs one or more slave radios coupled to the master radio to monitor the dedicated wireless connection during the defined time window to facilitate a location determination of the UE based on a collection of one or more measurements of the dedicated wireless connection during the defined time window by each of the one or more slave radios, as shown in block 910. The instruction of 910 can be relayed by the master radio to the slave radio(s) over a short-range connection, such as a Bluetooth connection (e.g., if the slave radios are Bluetooth radios) or via physical cabling (e.g., coaxial cables via CANBUS).

With respect to 910 of FIG. 9, in an embodiment, the one or more slave radios may be capable of establishing their own one-to-one dedicated wireless connections with the UE (e.g., via the communications interface 665 of FIG. 6). However, establishing another dedicated wireless connection between the UE and each slave radio (different from the dedicated wireless connection that already exists between the UE and the master radio) is slow because the UE would need to separately connect to each slave radio in turn, similar to the RF switch cycling between the receive antenna arrays between 330-340 to detect the set of AoA signals 325 as described above with respect to FIG. 3. Accordingly, in another embodiment, instead of establishing such connections, the monitoring instructed to be performed by the one or more slave radios may be implemented as a form of eavesdropping (in lieu of a connection where the UE actually knows that the UE is in communication with the one or more slave radios). In other words, the one or more slave radios may be instructed to tune to a particular frequency used by the dedicated wireless connection, i.e., instructed to eavesdrop upon the dedicated wireless connection, during the defined time window despite not actually being part of the dedicated wireless connection. So, the one or more slave radios are simply told precisely how and when to measure the dedicated wireless connection in order to collect measurements (e.g., AoA measurements, signal strength measurements or RSSIs, etc.) of a channel (or frequency) used by the dedicated wireless connection or of the specific set of AoA signals that are transmitted by the UE on the dedicated wireless connection. In this case, the UE does not actually need to be aware of the presence of the one or more slave radios and/or the monitoring (or eavesdropping) performed by the one or more slave radios.

Figure 10:
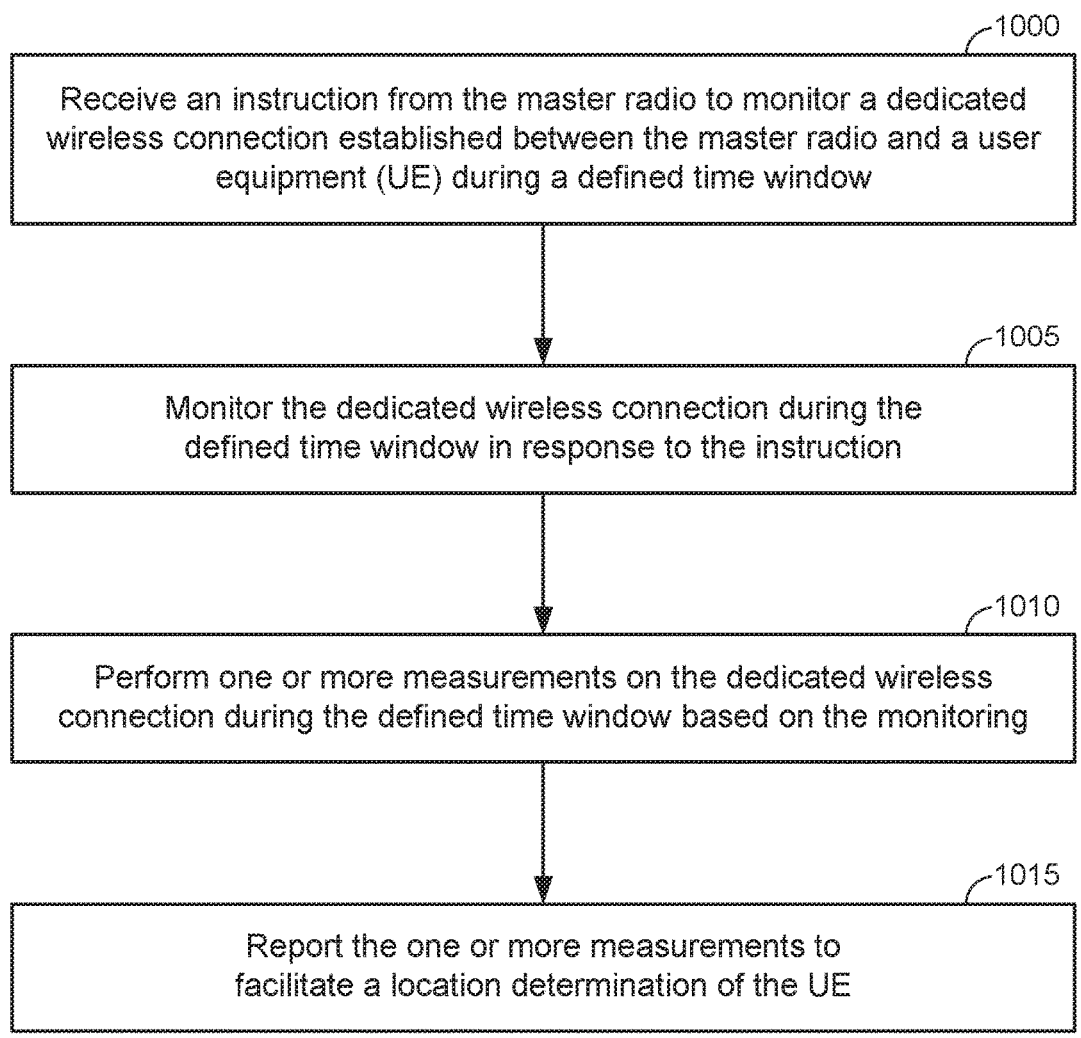
FIG. 10 illustrates a process of coordinating measurements by a slave radio of signals transmitted by a UE within a defined time window in accordance with an embodiment of the disclosure.

FIG. 10 illustrates a process of coordinating measurements by a slave radio of signals transmitted by a UE within a defined time window in accordance with an embodiment of the disclosure. The process of FIG. 10 may be implemented by one of the slave radios discussed above with respect to FIG. 9, such as one of slave radios 1 . . . N of FIG. 6 and/or one of slave radios 725a . . . 725e of FIG. 7.

Referring to FIG. 10, the slave radio receives an instruction from the master radio to monitor a dedicated wireless connection established between the master radio and the UE during a defined time window, as shown in block 1000 (e.g., similar to 910 of FIG. 9). The instruction of 1000 can be relayed by the master radio to the slave radio(s) over a short-range connection, such as a Bluetooth connection (e.g., if the slave radios are Bluetooth radios) or via physical cabling (e.g., coaxial cables via CANBUS). In response to the instruction of block 1000, the slave radio monitors the dedicated wireless connection during the defined time window, as shown in block 1005. Based on the monitoring of block 1005, the slave radio performs one or more measurements on the dedicated wireless connection during the defined time window based on the monitoring, as shown in block 1010. The measurements collected by the slave radio at block 1010 may include any of the following:

One or more Angle of Arrival (AoA) measurements (e.g., relative phase measurements from multiple antenna arrays as discussed above with respect to FIGS. 1-3, "raw" or complex signal samples, an actual processed AoA detection that indicates a calculated AoA value, such as θ being calculated based on Equation 1 using a processor locally at the slave radio, etc.) of one or more signals on the dedicated wireless connection during the defined time window, One or more received power measurements of at least one signal on the dedicated wireless connection during the defined time window (e.g., the at least one signal is isolated and measured, which can be converted into an RSSI and reported), One or more received power measurements of a channel used by the dedicated wireless connection during the defined time window (e.g., the slave radio does need not attempt to isolate signals on the monitored spectrum but rather measures the spectrum or channel itself as instructed by the master radio), or Any combination thereof.

Referring to FIG. 10, the slave radio reports the one or more measurements to facilitate a location determination of the UE, as shown in block 1015. In an example, the slave radio may report the one or more measurements to the master radio at block 1015 (e.g., via connection 610), with the master radio configured to compute the location of the UE. In an alternative example, the slave radio may report the one or more measurements to another device at block 1015, for example, the measurement processing unit 620, where the measurement processing unit 620 is configured to compute the location of the UE. The reporting of 1015 can occur over a short-range connection, such as a Bluetooth connection (e.g., if the slave radios are Bluetooth radios) or via physical cabling (e.g., coaxial cables via CANBUS) and can involve the communications interface 665 of the slave radio.

Figure 11:
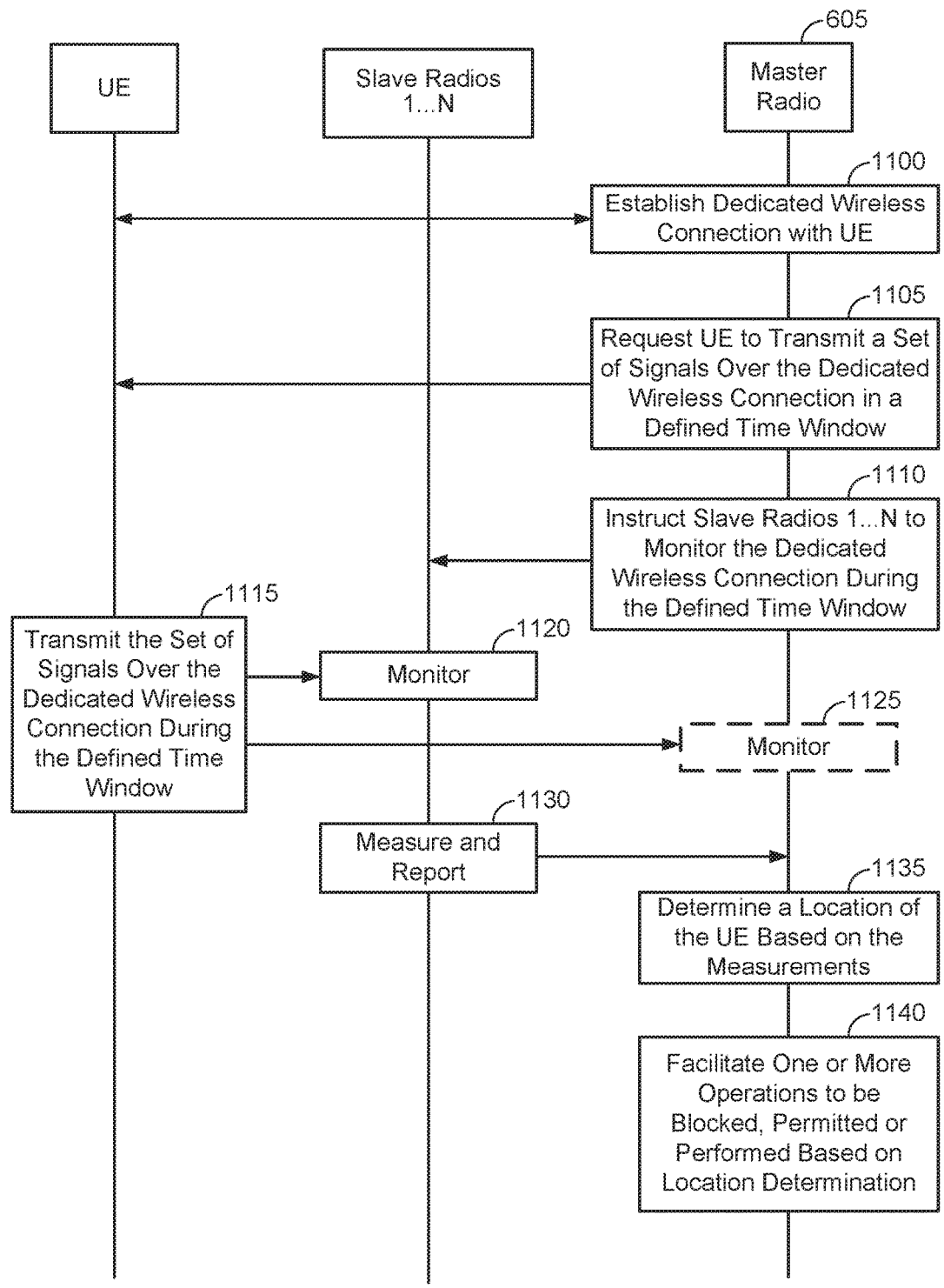
FIG. 11 illustrates an example implementation of the process of FIGS. 9-10 in accordance with an embodiment of the disclosure.

FIG. 11 illustrates an example implementation of the process of FIGS. 9-10 in accordance with an embodiment of the disclosure. In particular, the process of FIG. 11 illustrates a scenario where the measurement processing unit 620 is omitted and the master radio 605 performs the location computation for the UE based in part upon measurement report(s) from the slave radios 1 . . . N of the slave radio deployment 615 (shown in FIG. 6).

Referring to FIG. 11, the master radio 605 establishes a dedicated wireless connection between the master radio 605 and the UE, as shown in block 1100 (e.g., as in 900 of FIG. 9). The master radio 605 transmits a request for the UE to transmit a set of wireless signals over the dedicated wireless connection in a defined time window, as shown in block 1105 (e.g., as in 905 of FIG. 9). The master radio instructs slave radios 1 . . . N to monitor the dedicated wireless connection during the defined time window to collect measurements of the dedicated wireless connection during the defined time window, as shown in block 1110 (e.g., as in 910 of FIG. 9 or 1000 of FIG. 10).

Referring to FIG. 11, the UE transmits the set of wireless signals over the dedicated wireless connection during the defined time window, as shown in block 1115, which is monitored by the slave radios 1 . . . N, 1120 (e.g., as in 1005 of FIG. 10). The set of wireless signals over the dedicated wireless connection during the defined time window is also optionally monitored by the master radio 605, as shown in block 1125 (e.g., if the master radio 605 is equipped with the optional receive antenna array(s) 630). The slave radios 1 . . . N perform one or more measurements based on the monitoring and report one or more measurement results to the master radio 605, as shown in block 1130 (e.g., as in 1010-1015 of FIG. 10). The master radio 605 determines a location of the UE (e.g., a coarse location indication or region detection such as whether the UE is inside or outside a vehicle, a distance or relative location between the UE and the vehicle, etc.) based on the reported measurements, as shown in block 1135. If the master radio 605 also performed its own measurements of the dedicated wireless connection during the defined time window at block 1125, these measurements may also be factored into the location determination.

Referring to FIG. 11, the master radio 605 may use the location determination of block 1135 to facilitate one or more operations to be blocked, permitted or performed, as shown in block 1140. For example, the master radio 605 may directly block, permit or perform the operation(s), or alternatively may signal another component (e.g., a vehicle control system) to block, permit or perform the operation(s). Examples of the operations for which the master radio 605 may facilitate blocking, permitting or performing at block 1140 are provided below with respect to Table 1:

TABLE 1

| Example | Location Determination | Operation |
| --- | --- | --- |
| 1 | UE is outside vehicle | Unlock vehicle; or Block vehicle from starting. |
| 2 | UE transitions from outside to inside vehicle | Permit vehicle to start; or Automatically start vehicle. |
| 3 | UE is outside office building | Unlock office building doors |
| 4 | UE transitions from outside to inside building | Turn on one or more lights in building. |
| 5 | UE enters a particular room of building | Start computer; or Turn on light in room |
| 6 | UE directionality of approach | Unlock front or back doors |

As will be appreciated from a review of Table 1 (above), while certain embodiments are described with respect to vehicles, the master radio and slave radio deployments need not be limited to a vehicular environment, but can be deployed in any type of environment (e.g., in an office building, in an outdoor area, etc.).

Figure 12:
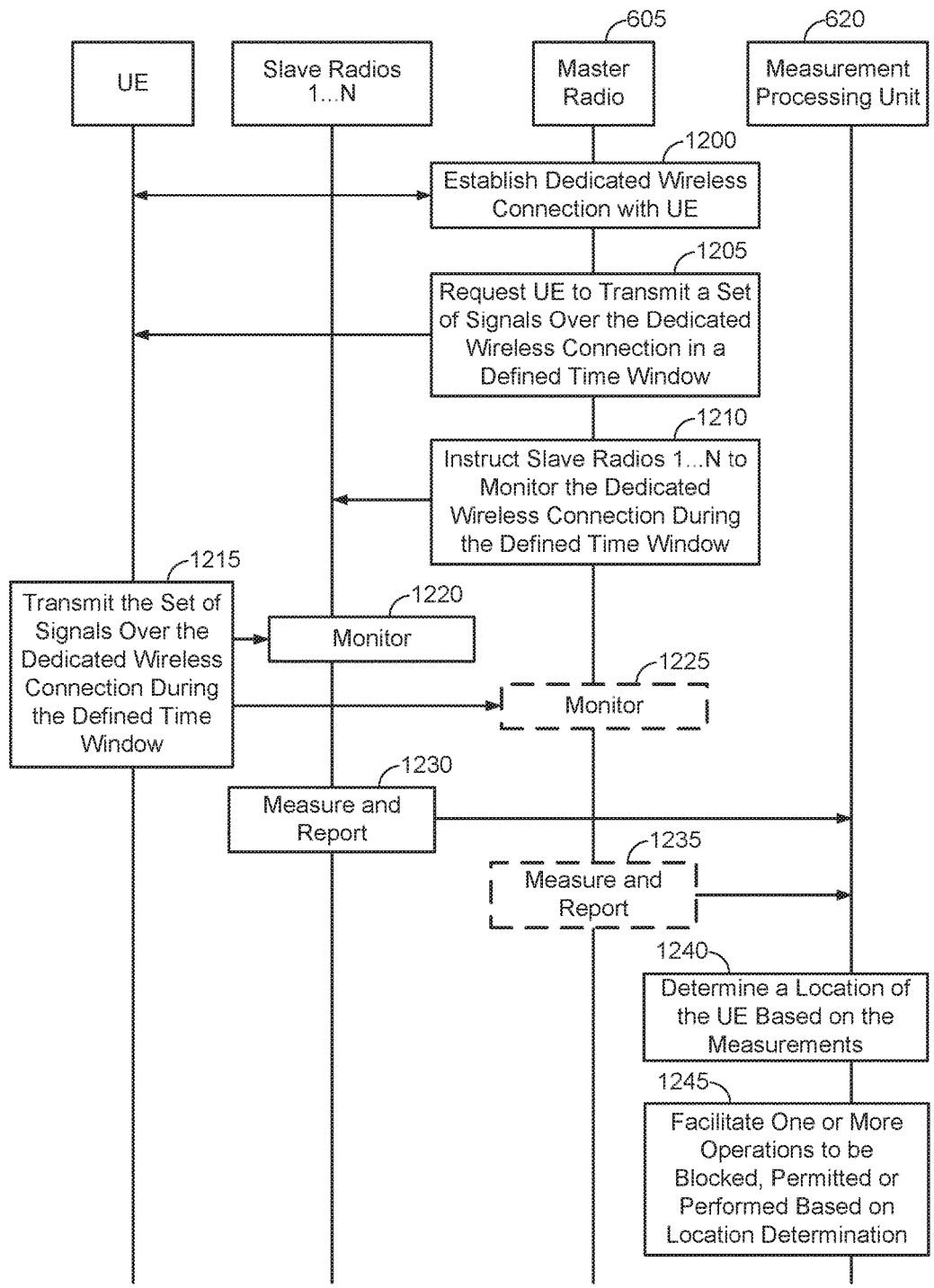
FIG. 12 illustrates an example implementation of the process of FIGS. 9-10 in accordance with another embodiment of the disclosure.

FIG. 12 illustrates an example implementation of the process of FIGS. 9-10 in accordance with another embodiment of the disclosure. In particular, the process of FIG. 12 illustrates a scenario where the measurement processing unit 620 is used to perform the location computation for the UE based in part upon measurement report(s) from the slave radios 1 . . . N of the slave radio deployment 615.

Referring to FIG. 12, blocks 1200-1225 substantially correspond to blocks 1100-1125 of FIG. 11, and will not be described further for the sake of brevity. At block 1230, the slave radios 1 . . . N perform one or more measurements based on the monitoring of block 1220 and report one or more measurement results to the measurement processing unit 620, as shown in block 1230 (e.g., as in 1010-1015 of FIG. 10). If the master radio 605 performs the optional monitoring at block 1225, the master radio similarly performs one or more measurements based on the monitoring of block 1225 and reports one or more measurement results to the measurement processing unit 620, as shown in block 1235.

Referring to FIG. 12, the measurement processing unit 620 determines a location of the UE (e.g., a coarse location indication or region detection such as whether the UE is inside or outside a vehicle, a distance or relative location between the UE and the vehicle, etc.) based on the reported measurements, as shown in block 1240 (e.g., similar to block 1135 of FIG. 0.11 except for being performed at the measurement processing unit 620 instead of the master radio 605). The measurement processing unit 620 may use the location determination of block 1240 to facilitate one or more operations to be blocked, permitted or performed, as shown in block 1245 (e.g., similar to 1140 of FIG. 11). For example, the master radio 605 may directly block, permit or perform the operation(s), or alternatively may signal another component (e.g., a vehicle control system) to block, permit or perform the operation(s) (e.g., see Table 1 above for various examples).

Figure 13:
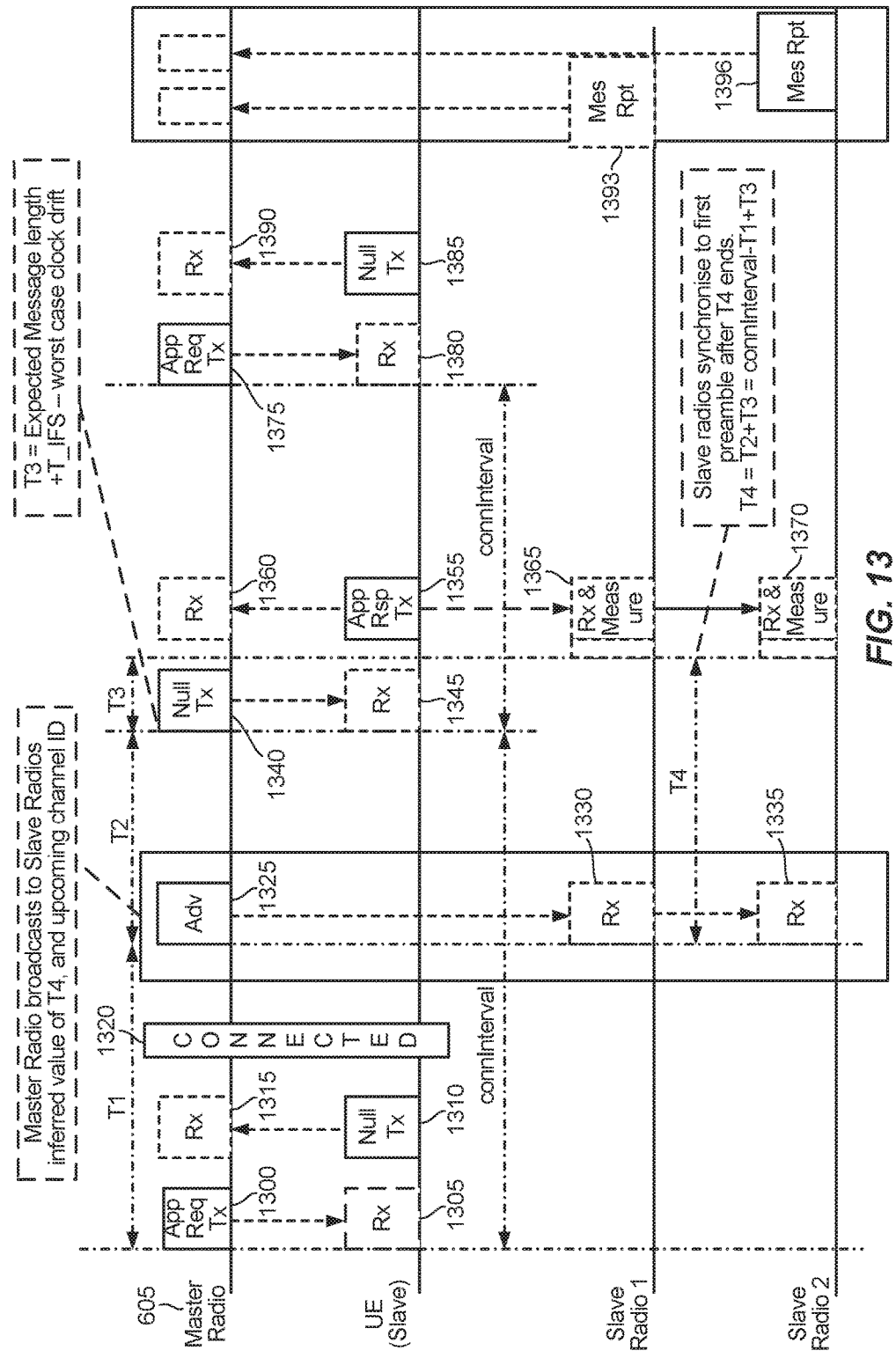
FIG. 13 illustrates an example of the signals exchanged between a master radio, a UE and multiple slave radios during the process of FIG. 11 in accordance with an embodiment of the disclosure.

FIG. 13 illustrates an example of the signals exchanged between the master radio 605, the UE and multiple slave radios during the process of FIG. 11 in accordance with an embodiment of the disclosure. FIG. 13 illustrates an implementation example that is similar in perspective to FIG. 3 in the sense that operation is described with respect to successive connection events or connIntervals.

Referring to FIG. 13, the master radio 605 and the UE exchange signals 1300-1315 to establish a dedicated wireless connection at 1320 (e.g., as in block 1100 of FIG. 11). In an example, the signals 1300-1315 may correspond to Bluetooth control message exchanges between a vehicle master radio (or car radio) and the UE (e.g., a phone, a keyfob, etc.). In an example, establishment of the dedicated wireless connection at 1320 may trigger a location determination session for the UE whereby the master radio 605 coordinates with the slave radios 1 . . . N to perform measurements (e.g., signal strength measurements, channel strength measurements, AoA measurements, etc.) on transmissions from the UE. The master radio 605 thereby in one example transmits on a dedicated connection 730*a*, 730*b*, 730*c*, 730*d*, 730*e* to each slave radio 725*a*, 725*b*, 725*c*, 725*d* and 725*e* (see FIG. 7) or in another example simply broadcasts (via connection 610) an advertisement to all the slave radios 1 . . . N that indicates a value of time period T4, where the time period T4 is an offset that instructs the slave radios 1 . . . N with regard to how and when to monitor the dedicated wireless connection, 1325 (e.g., as in block 1110 of FIG. 11), which is received at least by slave radios 1 and 2, 1330-1335. In an example, a time period T1 may cover a time between the beginning of a current connection event and a time when the master radio 605 begins to transmit the advertisement at 1325, a time period T2 may cover a time between the time when the master radio 605 begins to transmit the advertisement at 1325 and a next connection event, a time period T3 may start at the beginning of the next connection event with a duration equal to an expected message length, in the illustrated example, equal the length of the Null Packet 1340+T_IFS, and T4 may span both T2 and T3.

The broadcasted advertisement at 1325 may also include a channel identifier (ID) for the dedicated wireless connection so that the slave radios 1 . . . N can identify the dedicated wireless connection to be monitored. Also, if the dedicated wireless connection supports encryption, the slave radios 1 . . . N do not actually need to know how to decrypt the data on the dedicated wireless connection to monitor and measure the dedicated wireless connection in accordance with the instructions of the broadcasted advertisement of 1325.

Referring to FIG. 13, the next connection event begins with a null transmission period 1340-1345 to facilitate time calibration between the master radio 605 and the UE, followed by the UE waiting a T_IFS and then performing an initial packet transmission 1355 (e.g., denoted as AppRspTx, whereby AppRspTx may correspond to block 1115 of FIG. 11) which is received by the master radio 605 at 1360. The initial packet transmission 1355 may include an appended transmission of a set of AoA signals (e.g., a tone of all is with 250 kHz offset, etc.). The slave radios 1 . . . N synchronize to a first preamble after T4 ends, at which point the slave radios 1 . . . N monitor the dedicated wireless connection for a given duration (e.g., the duration may be specified in the broadcasted advertisement at 1325-1335, the duration may be determined from the header of the packet being received or the duration may end when the UE stops transmitting the appended AoA signal during 1355, etc.) and collect measurements thereon, 1365-1370 (e.g., as in blocks 1120-1130 of FIG. 11). This duration, which starts after time period T4, corresponds to the defined time window for the monitoring of block 1120 in FIG. 11. In contrast to FIG. 3, in an example, the slave radios 1 . . . N each independently perform the monitoring and measuring of 1365-1370 such that RF switching need not be coordinated by the master radio across the antenna array(s) attached to it (e.g., each slave radio autonomously monitors the dedicated wireless connection to perform signal and/or channel measurements thereon). In an example, the master radio 605 may also perform the measurements at 1360 (e.g., as in block 1125 of FIG. 11), although this is optional.

Referring to FIG. 13, the next connInterval begins with a message exchange between the master radio 605 and the UE, 1375-1390. The slave radios 1 . . . N report the measurements from 1365-1370 to the master radio 605 at 1393-1396 (e.g., as in block 1130 of FIG. 11). While not illustrated in FIG. 13, the slave radios 1 . . . N may alternatively report the measurements to the measurement processing unit 620 as in 1230 of FIG. 12.

Figure 14:
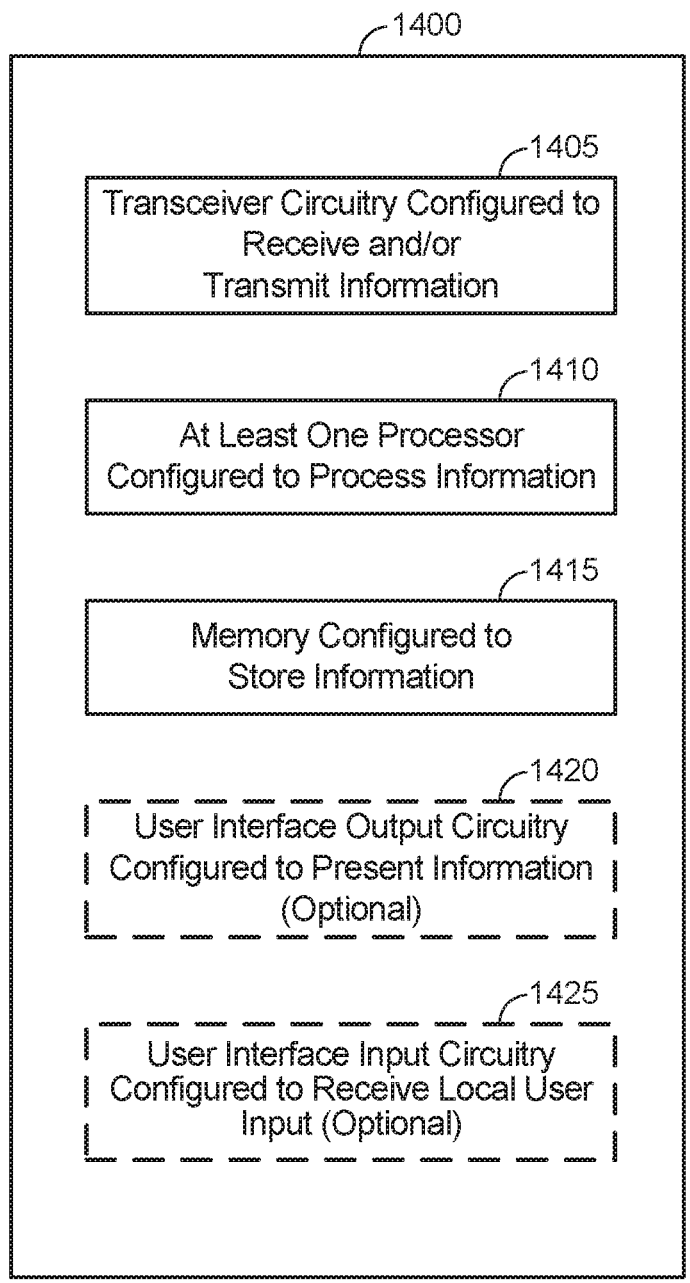
FIG. 14 illustrates a communications device that includes structural components in accordance with an embodiment of the disclosure.

FIG. 14 illustrates a communications device 1400 that includes structural components in accordance with an embodiment of the disclosure. The communications device 1400 can correspond to any of the above-noted communications devices, including but not limited to the master radio 505 or UE 510 of FIG. 5, any of the slave radios 1 . . . N, the master radio 605 or the measurement processing unit 620 of FIG. 6, the master radio 705 or UE 710 or any of the slave radios 725*a*-725*e* of FIG. 7 and/or UE 800 of FIG. 8. Thus, communications device 1400 can correspond to any electronic device that is configured to communicate with (or facilitate communication with) one or more other entities.

Referring to FIG. 14, the communications device 1400 includes transceiver circuitry configured to receive and/or transmit information 1405. In an example, if the communications device 1400 corresponds to a wireless communications device (e.g., UE, master radio, slave radio, etc.), the transceiver circuitry configured to receive and/or transmit information 1405 can include a wireless communications interface (e.g., LTE, LTE-D, Bluetooth GATT, NFC, WiFi, NFC, ZigBee, IEEE 802.15.4, etc.) such as a wireless transceiver and associated hardware (e.g., an RF antenna, a MODEM, a modulator and/or demodulator, etc.). In another example, the transceiver circuitry configured to receive and/or transmit information 1405 can correspond to a wired communications interface (e.g., a coaxial connection, serial connection, a universal serial bus (USB) or Firewire connection, an Ethernet connection through which the Internet can be accessed, etc.). Thus, if the communications device 1400 corresponds in part to a wired device, the transceiver circuitry configured to receive and/or transmit information 1405 can correspond to cabling to one or more external devices (e.g., a master radio with coaxial cabling that connects the master radio to one or more slave radios). In a further example, the transceiver circuitry configured to receive and/or transmit information 1405 can include sensory or measurement hardware by which the communications device 1400 can monitor its local environment (e.g., an accelerometer, a temperature sensor, a light sensor, an antenna for monitoring local RF signals, AoA detection hardware, RF signal strength and/or channel strength hardware, etc.). The transceiver circuitry configured to receive and/or transmit information 1405 can also include software that, when executed, permits the associated hardware of the transceiver circuitry configured to receive and/or transmit information 1405 to perform its reception and/or transmission function(s). However, the transceiver circuitry configured to receive and/or transmit information 1405 does not correspond to software alone, and the transceiver circuitry configured to receive and/or transmit information 1405 relies at least in part upon structural hardware to achieve its functionality. Moreover, the transceiver circuitry configured to receive and/or transmit information 1405 may be implicated by language other than "receive" and "transmit", so long as the underlying function corresponds to a receive or transmit function. For example, functions such as obtaining, acquiring, retrieving, measuring, etc., may be performed by the transceiver circuitry configured to receive and/or transmit information 1405 in certain contexts as being specific types of receive functions. In another example, functions such as sending, delivering, conveying, forwarding, etc., may be performed by the transceiver circuitry configured to receive and/or transmit information 1405 in certain contexts as being specific types of transmit functions. Other functions that correspond to other types of receive and/or transmit functions may also be performed by the transceiver circuitry configured to receive and/or transmit information 1405.

Referring to FIG. 14, the communications device 1400 further includes at least one processor configured to process information 1410. Example implementations of the type of processing that can be performed by the at least one processor configured to process information 1410 includes but is not limited to performing determinations, establishing connections, making selections between different information options, performing evaluations related to data, interacting with sensors coupled to the communications device 1400 to perform measurement operations, converting information from one format to another (e.g., between different protocols such as .wmv to .avi, etc.), and so on. For example, the at least one processor configured to process information 1410 can include a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 1410 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 1410 can also include software that, when executed, permits the associated hardware of the at least one processor configured to process information 1410 to perform its processing function(s). However, the at least one processor configured to process information 1410 does not correspond to software alone, and the at least one processor configured to process information 1410 relies at least in part upon structural hardware to achieve its functionality. Moreover, the at least one processor configured to process information 1410 may be implicated by language other than "processing", so long as the underlying function corresponds to a processing function. For example, functions such as evaluating, determining, calculating, identifying, etc., may be performed by the at least one processor configured to process information 1410 in certain contexts as being specific types of processing functions. Other functions that correspond to other types of processing functions may also be performed by the at least one processor configured to process information 1410.

Referring to FIG. 14, the communications device 1400 further includes memory configured to store information 1415. In an example, the memory configured to store information 1415 can include at least a non-transitory memory and associated hardware (e.g., a memory controller, etc.). For example, the non-transitory memory included in the memory configured to store information 1415 can correspond to RAM, flash memory, ROM, erasable programmable ROM (EPROM), an electronically erasable programmable ROM (EEPROM), registers, hard disk, a removable disk, a CD-ROM, or any other form of storage medium known in the art. The memory configured to store information 1415 can also include software that, when executed, permits the associated hardware of the memory configured to store information 1415 to perform its storage function(s). However, the memory configured to store information 1415 does not correspond to software alone, and the memory configured to store information 1415 relies at least in part upon structural hardware to achieve its functionality. Moreover, the memory configured to store information 1415 may be implicated by language other than "storing", so long as the underlying function corresponds to a storing function. For example, functions such as caching, maintaining, etc., may be performed by the memory configured to store information 1415 in certain contexts as being specific types of storing functions. Other functions that correspond to other types of storing functions may also be performed by the memory configured to store information 1415.

Referring to FIG. 14, the communications device 1400 further optionally includes user interface output circuitry configured to present information 1420. In an example, the user interface output circuitry configured to present information 1420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communications device 1400. In a further example, the user interface output circuitry configured to present information 1420 can be omitted for certain communications devices, such as network communications devices that do not have a local user (e.g., network switches or routers, remote servers, etc.). The user interface output circuitry configured to present information 1420 can also include software that, when executed, permits the associated hardware of the user interface output circuitry configured to present information 1420 to perform its presentation function(s). However, the user interface output circuitry configured to present information 1420 does not correspond to software alone, and the user interface output circuitry configured to present information 1420 relies at least in part upon structural hardware to achieve its functionality. Moreover, the user interface output circuitry configured to present information 1420 may be implicated by language other than "presenting", so long as the underlying function corresponds to a presenting function. For example, functions such as displaying, outputting, prompting, conveying, etc., may be performed by the user interface output circuitry configured to present information 1420 in certain contexts as being specific types of presenting functions. Other functions that correspond to other types of storing functions may also be performed by the user interface output circuitry configured to present information 1420.

Referring to FIG. 14, the communications device 1400 further optionally includes user interface input circuitry configured to receive local user input 1425. In an example, the user interface input circuitry configured to receive local user input 1425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communications device 1400. In a further example, the user interface input circuitry configured to receive local user input 1425 can be omitted for certain communications devices, such as network communications devices that do not have a local user (e.g., network switches or routers, remote servers, etc.). The user interface input circuitry configured to receive local user input 1425 can also include software that, when executed, permits the associated hardware of the user interface input circuitry configured to receive local user input 1425 to perform its input reception function(s). However, the user interface input circuitry configured to receive local user input 1425 does not correspond to software alone, and the user interface input circuitry configured to receive local user input 1425 relies at least in part upon structural hardware to achieve its functionality. Moreover, the user interface input circuitry configured to receive local user input 1425 may be implicated by language other than "receiving local user input", so long as the underlying function corresponds to a receiving local user function. For example, functions such as obtaining, receiving, collecting, etc., may be performed by the user interface input circuitry configured to receive local user input 1425 in certain contexts as being specific types of receiving local user functions. Other functions that correspond to other types of receiving local user input functions may also be performed by the user interface input circuitry configured to receive local user input 1425.

Referring to FIG. 14, while the configured structural components of 1405 through 1425 are shown as separate or distinct blocks in FIG. 14 that are implicitly coupled to each other via an associated communication bus (not shown expressly), it will be appreciated that the hardware and/or software by which the respective configured structural components of 1405 through 1425 perform their respective functionality can overlap in part. For example, any software used to facilitate the functionality of the configured structural components of 1405 through 1425 can be stored in the non-transitory memory associated with the memory configured to store information 1415, such that the configured structural components of 1405 through 1425 each performs their respective functionality (i.e., in this case, software execution) based in part upon the operation of software stored by the memory configured to store information 1415. Likewise, hardware that is directly associated with one of the configured structural components of 1405 through 1425 can be borrowed or used by other of the configured structural components of 1405 through 1425 from time to time. For example, the at least one processor configured to process information 1410 can format data into an appropriate format before being transmitted by the transceiver circuitry configured to receive and/or transmit information 1405, such that the transceiver circuitry configured to receive and/or transmit information 1405 performs its functionality (i.e., in this case, transmission of data) based in part upon the operation of structural hardware associated with the at least one processor configured to process information 1410.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a master radio, comprising:
   establishing a dedicated wireless connection between the master radio and a user equipment (UE);
   transmitting a request for the UE to transmit a set of wireless signals over the dedicated wireless connection in a defined time window; and
   instructing one or more slave radios coupled to the master radio to monitor the dedicated wireless connection during the defined time window to facilitate a location determination of the UE based on a collection of one or more measurements of the dedicated wireless connection during the defined time window by each of the one or more slave radios,
   wherein the one or more measurements include:
      one or more Angle of Arrival (AoA) measurements of one or more signals on the dedicated wireless connection during the defined time window,
      one or more received power measurements of at least one signal on the dedicated wireless connection during the defined time window,
      one or more received power measurements of a channel used by the dedicated wireless connection during the defined time window, or
      any combination thereof.

2. The method of claim 1, wherein the dedicated wireless connection is a short-range connection.

3. The method of claim 2, wherein the short-range connection is one of BLUETOOTH, WiFi, ZIGBEE, near-field communication (NFC) or IEEE 802.15.4.

4. The method of claim 1,
   wherein the one or more measurements include raw or complex signal samples by which the master radio or another device can calculate an AoA value, or
   wherein the one or more measurements include a calculated AoA value that is calculated locally at each slave radio.

5. The method of claim 1,
   wherein the master radio also monitors and measures the dedicated wireless connection during the defined time window, and
   wherein at least one measurement of the dedicated wireless connection by the master radio is used in conjunction with the collection of the one or more measurements by each of the one or more slave radios to facilitate the location determination of the UE.

6. The method of claim 1, further comprising:
   receiving, at the master radio, the one or more measurements from each of the one or more slave radios.

7. The method of claim 6, further comprising:
   determining a location of the UE based on the received measurements.

8. The method of claim 1, wherein the instructing instructs the one or more slave radios to report the one or more measurements from each of the one or more slave radios to a measurement processing unit that is separate from the master radio.

9. The method of claim 1, wherein the master radio and the one or more slave radios are wirelessly coupled.

10. The method of claim 1, wherein the master radio and the one or more slave radios are coupled via one or more wired connections.

11. The method of claim 10, wherein the one or more wired connections include a Controller Area Network bus (CANBUS).

12. The method of claim 1,
    wherein each of the one or more slave radios is capable of establishing a separate dedicated wireless connection with the UE, and
    wherein the instructing instructs the one or more slave radios to monitor the dedicated wireless connection for the set of wireless signals so as to eavesdrop upon the dedicated wireless connection between the master radio and the UE in lieu of the one or more slave radios establishing another dedicated wireless connection with the UE.

13. A master radio, comprising:
    a processor, a memory and a communications interface configured to:
       establish a dedicated wireless connection between the master radio and a user equipment (UE),
       transmit a request for the UE to transmit a set of wireless signals over the dedicated wireless connection in a defined time window, and instruct one or more slave radios coupled to the master radio to monitor the dedicated wireless connection during the defined time window to facilitate a location determination of the UE based on a collection of one or more measurements of the dedicated wireless connection during the defined time window by each of the one or more slave radios,
   wherein the one or more measurements include:
      one or more Angle of Arrival (AoA) measurements of one or more signals on the dedicated wireless connection during the defined time window,
      one or more received power measurements of at least one signal on the dedicated wireless connection during the defined time window,
      one or more received power measurements of a channel used by the dedicated wireless connection during the defined time window, or
      any combination thereof.

14. The master radio of claim 13,
wherein the master radio and the one or more slave radios are wirelessly coupled, or
wherein the master radio and the one or more slave radios are coupled via one or more wired connections.

15. A master radio, comprising:
means for establishing a dedicated wireless connection between the master radio and a user equipment (UE);
means for transmitting a request for the UE to transmit a set of wireless signals over the dedicated wireless connection in a defined time window; and
means for instructing one or more slave radios coupled to the master radio to monitor the dedicated wireless connection during the defined time window to facilitate a location determination of the UE based on a collection of one or more measurements of the dedicated wireless connection during the defined time window by each of the one or more slave radios,
   wherein the one or more measurements include:
      one or more Angle of Arrival (AoA) measurements of one or more signals on the dedicated wireless connection during the defined time window,
      one or more received power measurements of at least one signal on the dedicated wireless connection during the defined time window,
      one or more received power measurements of a channel used by the dedicated wireless connection during the defined time window, or
      any combination thereof.

16. The master radio of claim 15,
wherein the master radio and the one or more slave radios are wirelessly coupled, or
wherein the master radio and the one or more slave radios are coupled via one or more wired connections.

17. The method of claim 1,
wherein the one or more slave radios are arranged at one or more locations of a vehicle, and
wherein the location determination of the UE is relative to the vehicle.

18. The master radio of claim 13,
wherein the one or more slave radios are arranged at one or more locations of a vehicle, and
wherein the location determination of the UE is relative to the vehicle.

19. The master radio of claim 15,
wherein the one or more slave radios are arranged at one or more locations of a vehicle, and
wherein the location determination of the UE is relative to the vehicle.

* * * * *